Porter & Roberts,
Reel.
No. 80,664. Patented Aug. 4, 1868.
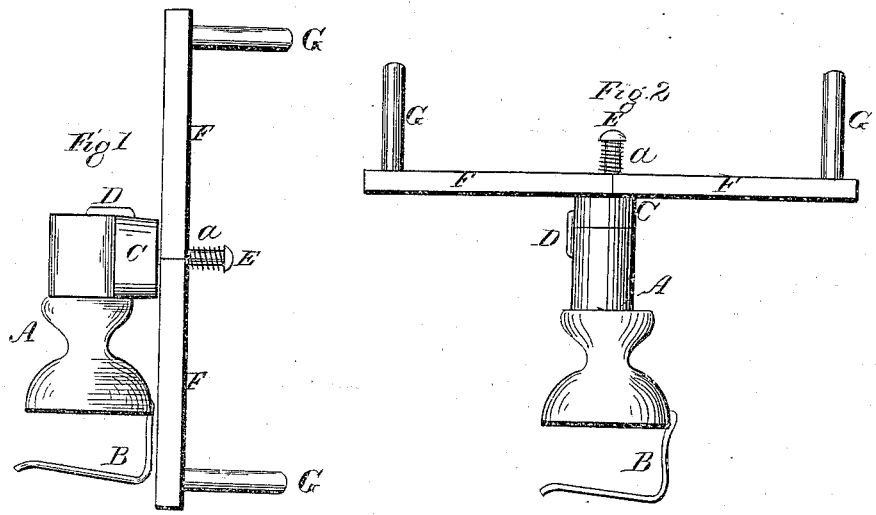
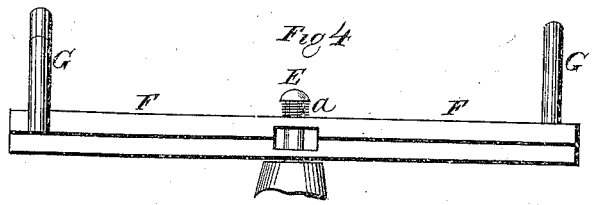
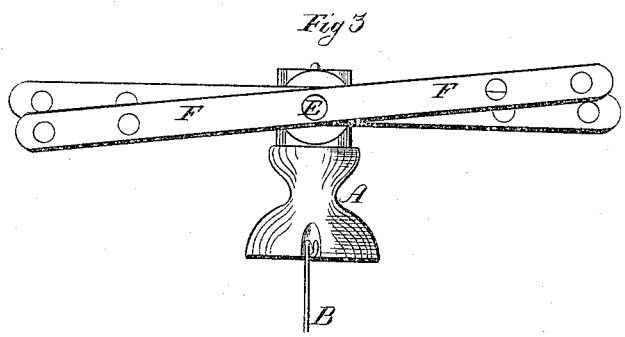
Witnesses
Wm. Vanolben
Leopold Evert
Inventors
E. N. Porter
P. P. Roberts

United States Patent Office.

E. N. PORTER AND P. P. ROBERTS, OF MORRISVILLE, VERMONT.

Letters Patent No. 80,664, dated August 4, 1868.

IMPROVEMENT IN SWIFTS OR REELS.

*The Schedule referred to in these Letters Patent and making part of the same.*

TO ALL WHOM IT MAY CONCERN:

Be it known that we, E. N. PORTER and P. P. ROBERTS, of Morrisville, in the county of Lamoille, and in the State of Vermont, have invented certain new and useful Improvements in Swifts and Reels; and do hereby declare that the following is a full, clear, and exact description thereof, reference being had to the accompanying drawings, and to the letters of reference marked thereon.

In the annexed drawings, forming part of this specification—

Figures 1 and 2 are side views of the combined swift and reel when ready for use, and Figures 3 and 4 the same when folded.

The nature of our invention consists in providing a swift with a hook, so that it can be moved to the side of its support, and be used as a reel, and, at the same time, providing the pivot, around which the arms revolve, with a spring, to hold them steady and in place, all as hereinafter set forth.

To enable others skilled in the art to make and use our invention, we will proceed to describe its construction and operation.

A represents a support or standard, fastened to the table by means of a coiled hook, B. This standard A is made flat on one side, at its upper part, so that the block C can be placed on the side of the standard. This block, C, is placed on top of the standard, and held there by means of a hook, D, which is fastened in the side of the block, and stuck into a hole made for that purpose in the side of the standard, as shown in fig. 2. In the centre of the top of block C is a pin, E, securely fastened, around which the arms F F revolve. These arms are placed at right angles, and have notches, one on the upper and the other on the lower side, in the centre, as shown in fig. 4, to hold them in proper place, thus forming a cross. There is also a spiral spring, $a$, which is held, by the head of the pin E, around it, and resting on one of the arms, thereby preventing the arms from slipping out of the notches, which will sometimes occur when not provided with such a spring. The arms are provided with holes, for the insertion of pins G G, which hold the cotton or yarn.

When it is desired to use the device as a reel, unhook the block C from the top of the standard A, and place it on and against the square side of the standard, inserting the hook D in a hole on top of the standard A, as shown in fig. 1.

When the machine is not in use, the arms will be folded together, as shown in figs. 3 and 4.

Having thus fully described our invention, what we claim as new, and desire to secure by Letters Patent, is—

The arrangement of the spiral spring $a$, pin E, perforated arms F F, with the block C, hook D, and standard A, substantially as and for the purposes herein set forth.

In testimony that we claim the foregoing, we have hereunto set our hands and seals, this first day of May, 1868.

E. N. PORTER. [L. S.]
P. P. ROBERTS. [L. S.]

Witnesses:
ELIZA L. PLACE,
LOUISE GARVIN.